Feb. 14, 1928.
J. WALLACE
1,659,012
TIRE RIM TOOL
Filed April 14, 1927      2 Sheets-Sheet 2
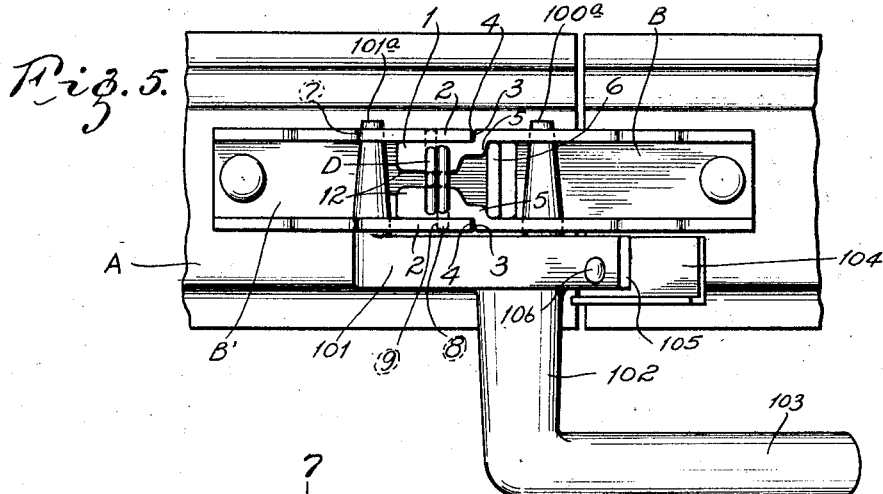
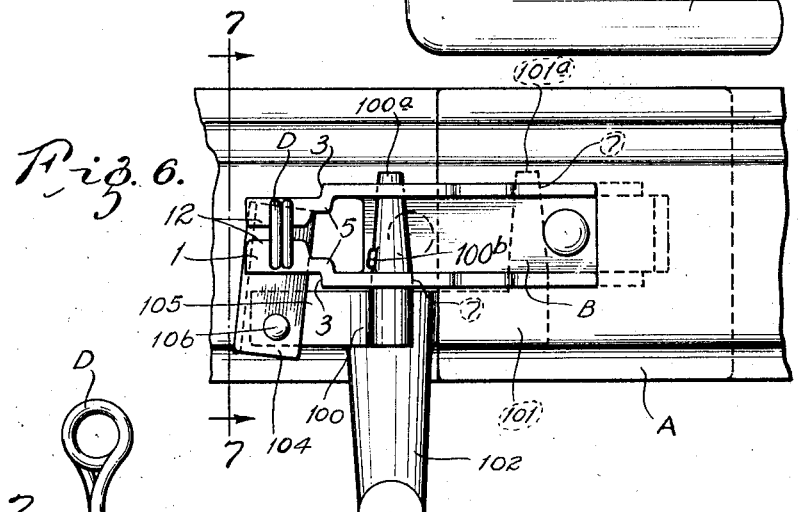
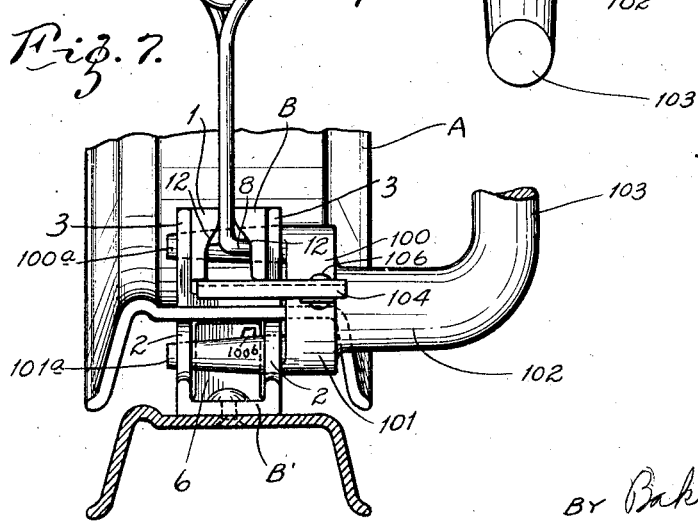
INVENTOR:
JAMES WALLACE.
BY Bakewell & Church
ATTORNEYS Patented Feb. 14, 1928.

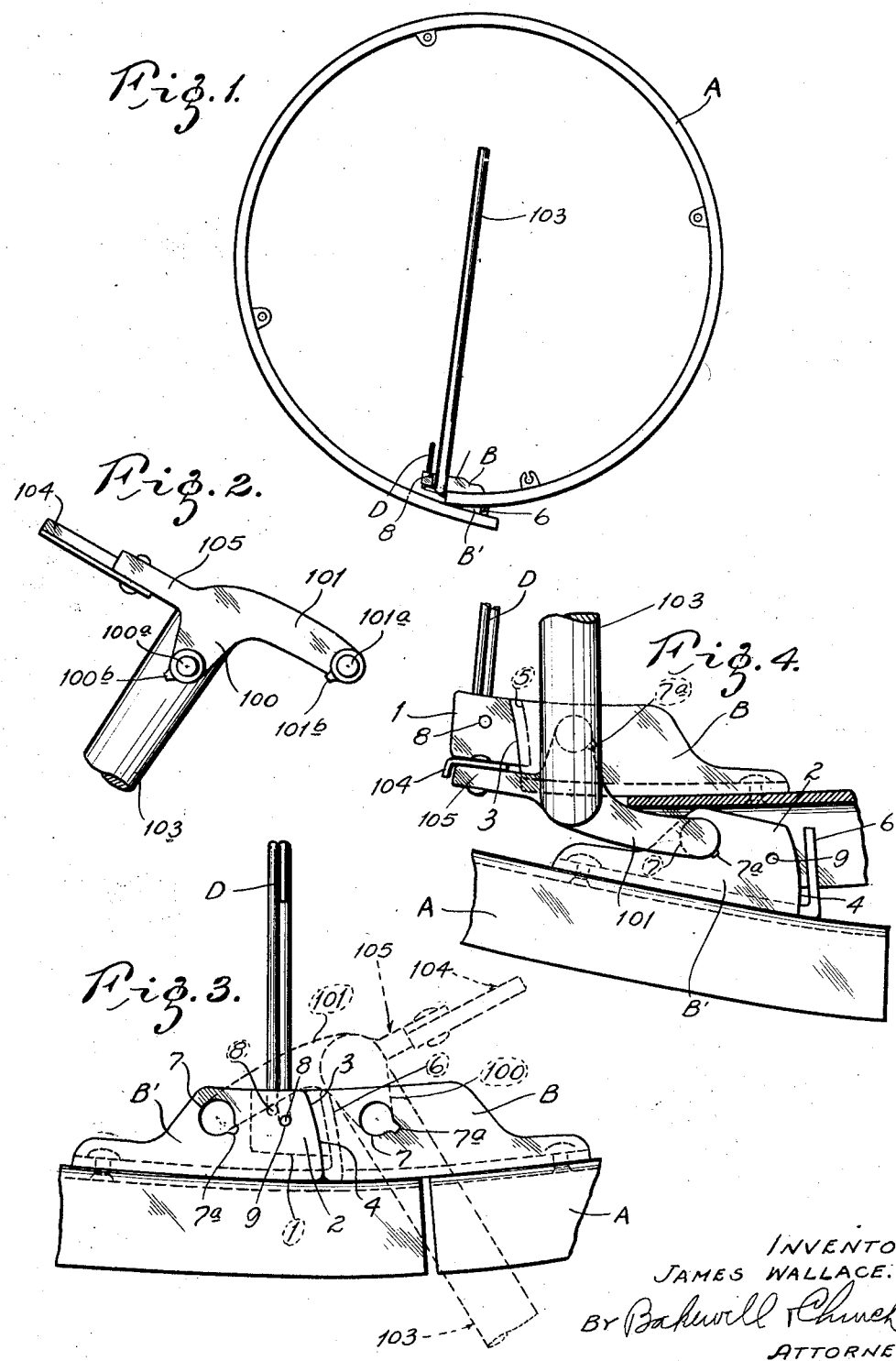

1,659,012

UNITED STATES PATENT OFFICE.

JAMES WALLACE, OF ST. LOUIS, MISSOURI.

TIRE-RIM TOOL.

Application filed April 14, 1927. Serial No. 183,762.

This invention relates to a tool that is adapted to be used for collapsing and expanding a transversely-split tire rim of the kind described in my United States Patent No. 1,621,614, dated March 22, 1927, and in my pending application for patent Serial No. 183,763, filed April 14, 1927, which comprises co-operating members attached to the end portions of the rim and provided with interlocking parts that prevent the end portions of the rim from moving transversely relatively to each other and from separating or moving relatively to each other circumferentially of the rim.

In a tire rim of the general type mentioned one member of the rim is provided with a reduced extension and radially-disposed internal and external shoulders arranged adjacent the inner end of said extension, and the other member of the rim is provided with side flanges that embrace said extension and butt against said external shoulders and is also equipped with a radially-disposed prong or hook that interlocks with said internal shoulders.

Accordingly, in the operation of collapsing the rim it is necessary to move one end portion of the rim inwardly towards the center of the rim, so as to disengage the interlocking parts on the co-operating members on the rim, and thereafter move one end portion of the rim circumferentially into overlapping relationship with the other end portion, so as to reduce the circumference of the rim sufficiently to enable the rim to be easily disengaged from or engaged with the beads on the tire casing.

One object of my invention is to provide a tire rim tool for collapsing and expanding a rim of the general type mentioned, that is convenient to operate, of such construction that it will not become accidentally disengaged from the co-operating members on the rim during the operation of collapsing or expanding the rim, and of such design that it will move one end portion of the rim into contact with or in close proximity to the other end portion of the rim during the collapsing operation, thereby producing maximum collapsing of the rim without subjecting the rim to an abnormal strain that tends to bend the rim or put a permanent "set" in same.

Another object of the invention is to provide a tire rim tool that is equipped with an efficient locking device of simple design, which is adapted to be actuated after the rim has been collapsed, so as to prevent the rim from expanding accidentally back to its normal condition.

Figure 1 of the drawings is a side elevational view, illustrating my improved rim tool arranged in operative engagement with a transversely-split tire rim and manipulated so as to lock the rim in its collapsed condition.

Figure 2 is a side elevational view of a portion of said tool.

Figure 3 is an enlarged side elevational view of a portion of the rim, illustrating in broken lines how my improved rim tool is adapted to be engaged with the co-operating members on the end portions of the rim when the rim is in its normal expanded condition.

Figure 4 is a side elevational view, partly in section, illustrating the tool manipulated so as to lock the rim in its collapsed condition.

Figure 5 is a top plan view of the co-operating members on the end portions of the rim, showing my improved tool arranged in engagement with said members, preparatory to collapsing the rim.

Figure 6 is a view similar to Figure 5, after the tool has been manipulated to collapse the rim and lock it in its collapsed condition; and Figure 7 is a transverse sectional view, taken on the line 7—7 of Figure 6, looking in the direction indicated by the arrows.

The tire rim A with which my improved tool is adapted to be used is of the transversely split type, and the end portions of said rim are provided with co-operating members B and B' that are equipped with interlocking parts which prevent the end portions of the rim from pulling apart or from moving transversely relatively to each other. The member B is provided at one end with a reduced extension 1 that fits between side flanges 2 on the member B', and radially-disposed, external shoulders 3 are formed on the member B adjacent the inner end of said extension 1, so as to form abutting sufaces that co-operate with the end faces 4 on the side flanges 2 of the member B' when the rim is expanded, said shoulders 3 and end faces 4 being preferably curved on the arc of a circle, as shown in Figure 3, so that they will move freely into and out of engagement with each other during the operation of collapsing and expanding the rim. The member B is also provided with internal, radially-disposed shoulders 5, and the member B' is provided with a lug or prong 6 that co-operates with said internal shoulders 5 to prevent the end portions of the rim from pulling apart and moving circumferentially relatively to each other when the rim is in its normal expanded condition. When the rim is expanded the co-operating members B and B' on same are held securely locked together by a locking device D which comprises laterally-projecting pins 8 arranged transversely in the extension 1 of the member B and adapted to enter holes 9 in the side flanges 2 of the member B', said locking pins being adapted to be retracted or withdrawn from the holes 9 by swinging the locking device D upwardly into the position shown in Figures 1, 3, 4 and 7, so as to cause the shanks of said locking device that carry the pins 8 to co-operate with cams 12 on the extension 1 that exert pressure on said shank in a direction to withdraw the pins 8 from the holes 9.

While my improved tool is designed primarily for use with a tire rim of the construction above described, it is not limited to use with a rim of this particular design, but is capable of being used with various other kinds of transversely split tire rims in which the end portions of the rim are provided with co-operating members, one of which is adapted to be moved inwardly out of interlocking engagement with the other member, and thereafter moved circumferentially into overlapping relation with same, so as to collapse the rim and reduce the circumference of same. Said tool comprises a head piece composed of two arms 100 and 101 preferably arranged at substantially right angles to each other and equipped with laterally-projecting pins 100$^a$ and 101$^a$ that are adapted to be inserted in holes 7 formed in the side flanges of the members B and B' on the end portions of the rim. In the form of my invention herein illustrated the pins 100$^a$ and 101$^a$ are tapered, as shown in Figures 5, 6 and 7, and the holes 7 in the side flanges of the members B and B' are proportioned so that it is impossible to arrange the tool in engagement with the members B and B' in an incorrect position. In other words, the flanges at one side of the members B and B' are provided with large holes 7, and the flanges at the other side of said members are provided with small holes 7, thus making it necessary to always arrange the tool at the proper side of the rim. In order to eliminate the possibility of the tool moving accidentally out of engagement with the co-operating members on the end portions of the rim, in the operation of collapsing or expanding the rim, the pins 100$^a$ and 101$^a$ of the tool are provided adjacent their inner ends with lugs 100$^b$ and 101$^b$ that are adapted to pass through slots 7$^a$ in the edges of the large holes 7 on the members B and B' during the operation of arranging the tool in engagement with the members B and B', and thereafter move out of registration with said slots when the tool is rocked in a direction to collapse the rim. When the rim is being expanded and when it is in its expanded condition, the lugs 100$^b$ and 101$^b$ bear against the inner faces of the side flanges of the members B and B' in which the large holes 7 are formed, and consequently, it is impossible for the pins on the tool to become disengaged from the co-operating members on the end portions of the rim.

The head piece of the tool is attached to a shank 102 that is disposed at substantially right angles to said head piece, and the handle 103 of the tool is connected to said shank and is so disposed that said handle extends substantially parallel to the arm 100 of the head piece, as shown clearly in Figures 2 and 4. The shank 102 is of such length that when the tool is in operative engagement with the rim, the handle 103 will be spaced laterally far enough from the rim to not strike against the tire casing during the operation of manipulating the tool to collapse or expand the rim. To collapse the rim the laterally-projecting pins 100$^a$ and 101$^a$ on the head piece of the tool are introduced into the holes 7 provided for same in the members B and B', as shown in full lines in Figure 5 and in broken lines in Figure 3. Thereafter the handle 103 of the tool is rocked into the position shown in Figures 1, 4 and 6, thereby causing the member B to be moved inwardly towards the center of the rim, out of interlocking engagement with the member B', and then moved circumferentially of rim into overlapping relationship with said member B'. After the rim has been collapsed, a locking device 104 on the tool is moved into engagement with the extension 1 on the member B, so as to prevent the head piece of the tool from turning relatively to the member B. As the head piece of the tool acts as a rigid link that joins the members B and B' together, and as the locking device 104 prevents the head piece of the tool from rocking or turning relatively to the member B, it will be obvious that the rim cannot accidentally expand back to its normal condition. The tool can be equipped with various kinds of locking devices for accomplishing the result just described, but I prefer to provide the head piece with an extension 105 that lies in the same vertical plane as the arms 100 and 101 when the tool is in use, and which serves as a support for the locking device 105 that is pivotally connected at 106 to said extension. When the tool is arranged in operative engagement with the members B and B' preparatory to collapsing the rim, the locking device 104 is positioned at one side of the member B and extends parallel to same, as shown in Figure 5, but after the rim has been collapsed, said locking device is adapted to be moved into a position at substantially right angles to the extension 105, as shown in Figure 6, so as to form a lateral projection on the head piece of the tool that co-operates with the extension 1 of the member B to effectively prevent the rim from expanding accidentally back to its normal condition. When the rim is to be expanded it is only necessary to swing the locking device 104 into longitudinal alignment with the part 105 on the head piece of the tool that carries said locking device, and thereafter move the handle 103 of the tool into the position indicated by dotted lines in Figure 3, thus causing the member B to be moved out of overlapping relationship with the member B' and thereafter outwardly so as to cause the interlocking parts on said members to properly engage each other.

A tire rim tool of the construction above described can be combined easily with a tire rim, it is convenient to operate, there is no liability of its slipping accidentally out of engagement with the rim when the rim is being collapsed or expanded, and it is equipped with a highly efficient means of simple design for securely locking the rim in its collapsed condition.

Having thus described my invention, what I claim as new and desire to secure by Letters Patent is:

1. A tool for collapsing and expanding a transversely-split tire rim, comprising a handle provided at its outer end with a laterally-projecting shank that is equipped with a head piece composed of two angularly-disposed arms located at one side of said handle, pins on said arms projecting laterally from the head piece in a direction opposite to the direction in which the shank projects from the head piece, that are adapted to be inserted in holes in co-operating members on the end portions of the rim, and lugs on said pins adjacent the inner ends of same arranged so that they will pass through slots in the edges of said holes during the operation of introducing the pins into said holes and thereafter will move out of registration with said slots during the operation of collapsing the rim.

2. A tool for collapsing and expanding a transversely-split tire rim, comprising a head piece provided with laterally-projecting devices that are adapted to be introduced into holes in co-operating members on the end portions of the rim, a handle for rocking said head piece in a direction to cause one member on the rim to move into overlapping relationship with the other member, and a locking device on said head piece that is adapted to be moved into engagement with one member on the rim to prevent the rim from springing back into its normally expanded condition.

3. A tool for collapsing and expanding a transversely-split tire rim, comprising a handle provided at its outer end with a laterally-projecting shank, a head piece on said shank composed of two angularly-disposed arms, laterally-projecting pins on said arms adapted to be inserted in holes in co-operating members on the end portions of the rim, laterally projecting lugs adjacent the inner end of said pins for preventing accidental withdrawal of same from said holes, an extension on said head piece disposed in substantially the same plane as the arms of said head piece, and a pivotally mounted locking device on said extension that is adapted to be moved laterally into engagement with the overlapped member at the inner side of the rim after the rim has been collapsed, so as to prevent the rim from accidentally springing back into its normally expanded condition.

JAMES WALLACE.